United States Patent [19]

Lundgreen

[11] 3,833,855

[45] Sept. 3, 1974

[54] COHERENT FILTER

[75] Inventor: Michael W. Lundgreen, Esterville, Iowa

[73] Assignee: Collins Radio Company, Dallas, Tex.

[22] Filed: Sept. 28, 1973

[21] Appl. No.: 401,779

[52] U.S. Cl. .................... 328/167

[51] Int. Cl. .................... H03b 1/04

[58] Field of Search .................... 328/167

[56] References Cited

UNITED STATES PATENTS

| | | | |
|---|---|---|---|
| 3,492,591 | 1/1970 | Shapiro | 328/167 |
| 3,493,876 | 2/1970 | Zimmerman | 328/167 |
| 3,534,272 | 10/1970 | Remley | 328/167 |
| 3,588,714 | 6/1971 | McIntosh | 328/167 X |

*Primary Examiner*—John S. Heyman
*Attorney, Agent, or Firm*—Richard W. Anderson; Robert J. Crawford

[57] ABSTRACT

A high Q bandpass filter employing coherent techniques to synthesize the fundamental component of an input signal under control of a driving signal with frequency like that of the input signal. Enacting maintenance of amplitude and phase characteristics is realized by a feedback loop wherein the output is subtracted from the input signal.

6 Claims, 1 Drawing Figure

Figure 1:
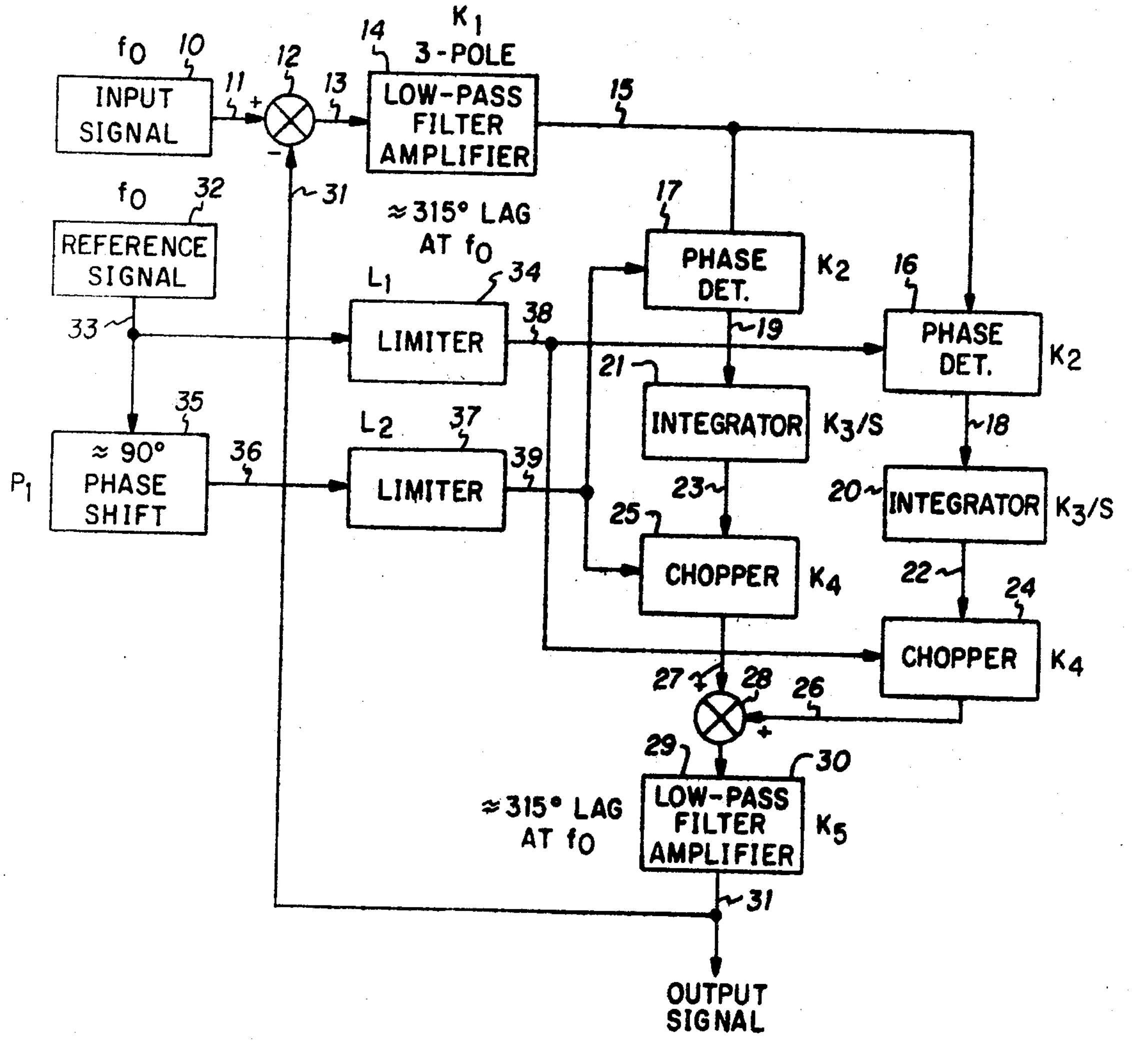

$$\text{OUTPUT} = \left[\frac{1}{1 + \frac{S}{K_1 K_2 K_3 K_4 K_5}}\right] \text{INPUT}$$

$$\text{OUTPUT} = \left[ \frac{1}{1 + \dfrac{S}{K_1 K_2 K_3 K_4 K_5}} \right] \text{INPUT}$$

COHERENT FILTER

This invention relates generally to methods and apparatus for filtering electrical signals and more particularly to an improved, extremely narrow-band, bandpass filter by means of which the fundamental component of an input signal may be passed to an output terminal with exacting maintenance of phase and amplitude information which may be carried by the input signal.

More particularly, the present invention relates to a filter circuitry which might be termed a coherent filter, since the center frequency of the filter is determined by the frequency of a reference signal input, and the output signal from the filter has the identical phase and amplitude as the input signal.

The particular filter to be described defines special usage in filtering an AC signal where the signal may vary in amplitude with one intelligence and in phase, with respect to some reference, in accordance with a second intelligence. For example, state of the art area navigation computers utilized for aircraft guidance employ signals which vary in amplitude with a distance to a ground DME station and vary in phase with respect to a particular reference signal as a function of bearing from a ground VOR (VHF omni-range) navigation station. Oftimes this signal, which is termed in the area navigation computer art as a variable phase signal and is ultimately phase and amplitude compared with a reference signal recovered from the ground transmission, is obscured in noise or exhibits extensive jitter with respect to the reference, and, as such, can not be employed to make accurate phase and amplitude comparisons.

Accordingly, the object of the present invention is the provision of an improved filter which operates as an extremely narrowband bandpass filter and which maintains with exacting integrity, the amplitude and phase information that may be carried by an input signal to be filtered.

The present invention is featured in the employment of a reference signal source input to a filter network which essentially synthesizes rectangular coordinates (quadrature coordinates) of the fundamental component of an input signal to be filtered, and recombines these quadrature components to reconstruct the fundamental component of the input signal. The input signal may be of itself so obscured with noise that the phase and amplitude information carried thereby can not be readily or accurately recovered.

The present invention is further featured in the provision of a coherent filter system which functions as a bandpass filter the center frequency of which is precisely defined by a reference input signal to the filter, and the bandwidth of which is extremely narrow, resulting in a narrow passband bandwidth filter having a very high Q, which characteristics can normally only be approached with known state of the art filter design techniques.

A still further object of the present invention is the provision of a narrow bandwidth bandpass filter having an extremely high Q and may be constructed from a unique combination of a minimal number of state of the art circuit elements.

These and other features and objects of the present invention will become apparent upon reading the following description with reference to the accompanying drawing in which the single FIGURE is a functional block diagram of a coherent filter in accordance with the present invention.

With reference to the FIGURE, an input signal source 10 to be filtered is applied as a first input 11 to a signal combining circuitry 12. A second input 31 to combining circuitry 12 comprises the output signal from the filter of the present invention. The input signal might, for example, comprise a 30 Hz variable signal carrying both amplitude and phase information, and appears at the output 31 from the coherent filter as the fundamental component of the input signal with complete maintenance of amplitude and phase information which might be carried by the input signal 11.

Signal combining circuitry 12 provides an output 13 which constitutes the difference between the filtered output signal 31 and the input signal 11. The different signal 13 is applied to a low-pass filter amplifier 14 which constitutes a 3-pole low-pass filter that has approximately 315° of lag. The output of filter 14 is then predominently the fundamental component of the applied signal with harmonics attenuated.

A reference signal source 32 provides a reference signal input 33 to the filter network. Reference signal 33 is frequency coherent with that of the input signal from source 10, and is utilized to generate two square waves in quadrature with each other (90° phase shift between them). Reference signal 33 is thus applied to a 90° phase shifter 35 which provides an input 36 to a limiter 37 the output 39 of which comprises a first one of these quadrature signals, while the reference signal 33 is applied directly to a further limiter 34 to provide an output 38 comprising the other of the quadrature signals.

The output 15 from low-pass filter amplifier filter 14 is applied as a first input to each of two phase detectors 16 and 17 which are driven by the outputs 38 and 39 from limiters 34 and 37, respectively. Phase detectors 16 and 17 provide output signals 18 and 19 which are integrated by associated integrators 20 and 21 to provide a DC signals 22 and 23. Signals 22 and 23 are then chopped in associated choppers 24 and 25 by the outputs from limiters 37 and 34, respectively. The outputs 26 and 27 from choppers 24 and 25 are added in a further signal combining network 28 with the sum of the chopper outputs 29 being applied as input to a further lowpass filter amplifier 30. Filter amplifier 30 may likewise comprise a 3-pole low pass filter amplifier which introduces approximately 315°.

The output 31 from low pass filter 30 comprises the filtered output signal of the present invention and a closed loop control is realized by applying the output signal 31 back to signal combining network 12 where it is subtracted from the input signal 11.

This closed loop feed back system systhesizes the output signals 31 to exactly match the fundamental component of the input signal from source 10. The action of the feed back system drives the voltages on integrators 20 and 21 until the output from the 3-pole filter 14 goes to zero (the difference between the input and output signals is zero). When this occurs, the outputs of phase detectors 16 and 17 are zero and the voltages on the associated integrators 20 and 21 stop changing. The phase detectors 16 and 17 and the signal choppers 24 and 25 are designed and phased to allow the feed back loop to adjust for any amplitude or phase of input signal from source 10. Proper operation is guaranteed in the feed back loop as long as the phase shift in the filters 14 and 30 (the collective phase shift) does not change more than 45°.

Errors in the system are minimized by having low off-set phase detectors, high signal gain in the low pass filter amplifier 14 and low off-sets in the integrators 20 and 21.

The action of the coherent filter of the present invention provides an output signal that tracks both phase and amplitude with the input signal and eliminates jitter or noise with respect to the reference signal. A filter in accordance with the present invention can be used to attenuate noise that might completely obscure the desired signal. For applications of the filter, a reference signal that is identical in frequency to the input signal to be filtered is required for high accuracy since, if the frequency of the input and the reference signal source which is utilized are different, gain and phase errors will be apparent as a function of this frequency difference and will be inversely proportional to the filter bandwidth.

As depicted in the FIGURE, low pass filter amplifier 14 might have a transfer function $K_1$, the phase detector 16 and 17 have a transfer function $K_2$, the integrators 20 and 21 have a transfer function $K_3/s$, the choppers 24 and 25 have transfer functions $K_4$ and the output low pass filter 30 have a transfer function $K_5$. The output signal 31 may then be defined as a signal having identical phase and amplitude as the input signal from source 10 except that it is filtered by the following overall transfer functions:

$$\frac{1}{1+\frac{s}{K_1K_2K_3K_4K_5}} \qquad (1)$$

Expression (1) describes a low-pass filter with a cut off frequency of $K_1$ $K_2$ $K_3$ $K_4$ $K_5/2\pi$ Hz. This low-pass filter is translated from the origin to $f_0$, the frequency of the input and reference signals, and therefore becomes a bandpass filter with a bandwidth of $K_1$ $K_2$ $K_3$ $K_4$ $K_5/\pi$. In a particular application of this circuitry which is caused to be constructed, $f_0$ was 30 Hz and the expression $K_1$ $K_2$ $K_3$ $K_4$ $K_5/2\pi$ was equal to 0.0265 Hz. This provided a bandwidth of 0.053 Hz at 30 Hz and the circuit thus operated as equivalent to a circuit with a Q of 566. Phase stability over temperature variation was within 0.1° and the gain stability was within 0.5 percent.

The present invention is thus seen to provide an improved filtering system utilizing state of the art components by means of which an input signal may be filtered in an extremely narrow bandwidth bandpass network and the output of the filtering network exactingly maintains the integrity of any phase and amplitude information which may be carried on the input signal.

Although the present invention has been described with respect to a particular embodiment thereof it is not to be limited as changes might be made thereof which fall within the scope of the invention as defined in the appended claims.

I claim:

1. The method of filtering and input signal in a narrow bandwidth, high Q circuit to obtain an output signal which maintains high accuracy phase and amplitude information carried by said input signal, comprising the steps of:

subtracting said output signal from said input signal to provide a different signal;

low-pass filtering said difference signal in a first filtering means;

quadraturizing a reference signal source with frequency substantially equal that of said input signal into first and second driving signals;

separately phase detecting said low-pass filtered different signal against each of said first and second driving signals in respective first and second phase detecting means;

separately integrating the outputs from each of said phase detecting means in respective first and second integrating means;

separately chopping the respective outputs of said first and second integrating means with respect to said second and said first ones of said driving signals in respective first and second signal chopping means;

summing the respective outputs from said first and second signal chopping means; and low-pass filtering the above-defined signal sum in a further low-pass filtering means the output of which comprises said output signal.

2. The method of claim 1 wherein each of said first and second low-pass filtering means comprises a 3-pole filter introducing substantially 315° signal lag at the frequency of said input signal.

3. The filtering method as defined in claim 2 wherein said first and second driving signals comprise respective square wave signals.

4. Signal filtering means whereby an output signal is caused to maintain both phase and amplitude characteristics carried by an input signal comprising;

means for subtracting said output signal from said input signal;

first low-pass filtering means receiving the output of said means for subtracting;

means for developing first and second mutually quadraturized driving signals with frequency substantially equal that of said input signal;

first and second phase detecting means receiving the output of said first low-pass filtering means as respective first inputs thereto and respective ones of said first and second driving signals as second inputs thereto;

means integrating the outputs from each of said phase detecting means;

means for chopping the respective outputs of each said means for integrating under control of respective ones of said first and second driving signals;

means for summing the outputs from respective ones of said means for chopping;

and second low-pass means receiving the output from said means for summing, the output from said second low-pass filtering means comprising said output signal.

5. Signal filtering means as defined in claim 4 wherein each of said first and second low pass filtering means comprises a 3-pole filter introducing substantially 315° phase lag at the frequency of said input signal.

6. Signal filtering means as defined in claim 5 wherein said first and second low-pass filtering means each include means for signal amplification with respective transfer functions of $K_1$ and $K_5$, said phase detecting means exhibiting transfer functions of $K_2$, said signal integrating means exhibiting transfer function of $K_3/s$, where s is the LaPlacian operator, said signal chopping means exhibiting transfer functions of $K_4$, said signal filtering means thereby functioning as a bandpass filter the transfer function of which is defined as $$\frac{1}{1+\frac{s}{K_1K_2K_3K_4K_5}}$$

and the bandwidth of which is defined as $K_1$ $K_2$ $K_3$ $K_4$ $K_5/\pi$.

* * * * *